United States Patent [19]

Tatsuta

[11] Patent Number: 4,617,424
[45] Date of Patent: Oct. 14, 1986

[54] SYSTEM FOR PREVENTING STEALING OF LINE IN RADIOTELEPHONY

[75] Inventor: Nobuhiro Tatsuta, Gunma, Japan

[73] Assignees: Sanyo Electric Co., Ltd.; Tokyo Sanyo Electric Co., Ltd., both of Japan

[21] Appl. No.: 608,464

[22] Filed: May 9, 1984

[30] Foreign Application Priority Data

May 30, 1983 [JP] Japan .................................. 58-96500

[51] Int. Cl.⁴ .............................................. H01Q 7/04
[52] U.S. Cl. ................................. 179/2 EA; 179/2 EB
[58] Field of Search ................. 179/2 EA, 2 EB, 2 E, 179/1.5 R-1.5 E; 455/26-30

[56] References Cited

U.S. PATENT DOCUMENTS 3,366,880  1/1968  Driver .......................... 179/2 EA X
3,586,787  6/1971  Vogelman et al. .............. 179/2 EA
4,291,197  9/1981  Yonaga .......................... 179/2 EA
4,332,981  6/1982  Palombi et al. .................. 179/2 EA Primary Examiner—Robert G. Lev
Attorney, Agent, or Firm—Darby & Darby

[57] ABSTRACT

A subsidiary telephone set successively transmits first and second pilot signals to a master telephone set. The master telephone set receives the first pilot signal to be brought in a standby state and subsequently receives the second pilot signal to be connected to a telephone line. Consequently, telephone communication is enabled.

14 Claims, 5 Drawing Figures

SYSTEM FOR PREVENTING STEALING OF LINE IN RADIOTELEPHONY

BACKGROUND OF THE INVENTION

1. Field of the Invention

The present invention relates to radiotelephony, and more particularly, it relates to a system for preventing stealing of the line in radiotelephony in which the master telephone set cannot be enabled by any subsidiary telephone set other than a specifically designated subsidiary telephone set.

2. Description of the Prior Art

In radiotelephony in which communication is made by reception and transmission of radio signals between a master telephone set connected to a telephone line and a portable subsidiary telephone set, there is a problem of stealing of the line such that the master telephone set is enabled by a subsidiary telephone set belonging to a third party to make telephone communication without permission. Therefore, a pilot signal for enabling the master telephone set of each of radiotelephones is made to have its own specific frequency. However, since such a pilot signal is continuously transmitted during communication for holding of the line, the frequency of the pilot signal cannot be selected from those within an audio frequency band. Further, the upper limit of the frequencies of the pilot signals out of the audio frequency range is restricted in consideration of modulation of the pilot signals. The range of the frequencies as employed for the pilot signals of the radiotelephony is thus limited, leading to inevitable approximation of the frequencies of the pilot signals. Accordingly, in a conventional radiotelephone, there is such a disadvantage that stealing of the line cannot be completely prevented. Although it has been proposed to encode of the pilot signals for effectively preventing stealing of the line, additional components such as encoders and decoders are required in this case, leading to a costly radiotelephone.

SUMMARY OF THE INVENTION

The present invention is directed to a system for preventing stealing of the line in radiotelephony having a master telephone set and a subsidiary telephone set making reception and transmission of radio signals therebetween, in which the master telephone set is connected to a telephone line in response to a pilot signal from the subsidiary telephone set.

According to the present invention, a subsidiary telephone set comprises pilot signal generating means for sequentially generating a first pilot signal having a first frequency and a second pilot signal having a second frequency and transmitting means for modulating a carrier wave signal by at least the first and second pilot signals and transmitting the modulated signal to a master telephone set. The master telephone set comprises receiving means for receiving and demodulating at least first and second pilot signals from the subsidiary telephone set, pilot signal detecting means connected to the receiving means for detecting whether the first and second pilot signals are successively received and connecting means coupled to the pilot signal detecting means for connecting the receiving means to a telephone line in response to a detection output from the pilot signal detecting means.

Accordingly, an essential object of the present invention is to provide a radiotelephone in which a master telephone set is not enabled by any subsidiary telephone set other than a specifically designated subsidiary telephone set.

According to the present invention, there are employed two kinds of pilot signals, i.e., first and second pilot signals in which, in addition, the first pilot signal can be selected from a relatively wide frequency range. Therefore, combination of the first and second pilot signals can be varied, leading to effective prevention of stealing of the line.

The above described object and other objects, features, aspects and advantages of the present invention will become more apparent from the following detailed description of the present invention when taken in conjunction with the accompanying drawings.

DESCRIPTION OF THE PREFERRED EMBODIMENT

Figure 1A:
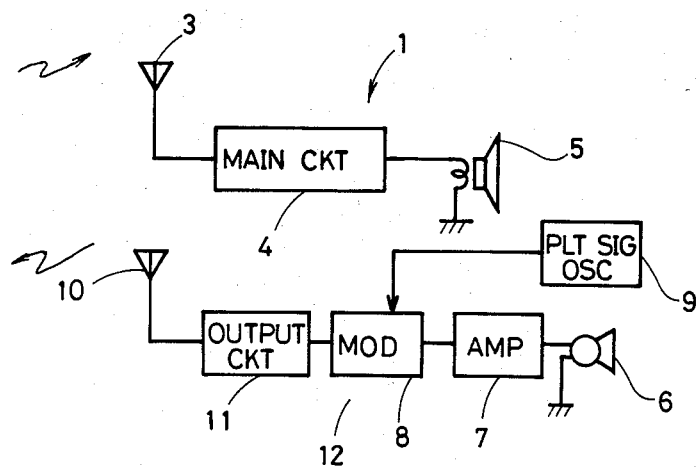
FIGS. 1A and 1B are block diagrams respectively showing a subsidiary telephone set and a master telephone set of a system for preventing stealing of the line in radiotelephony according to the present invention.
Figure 1B:
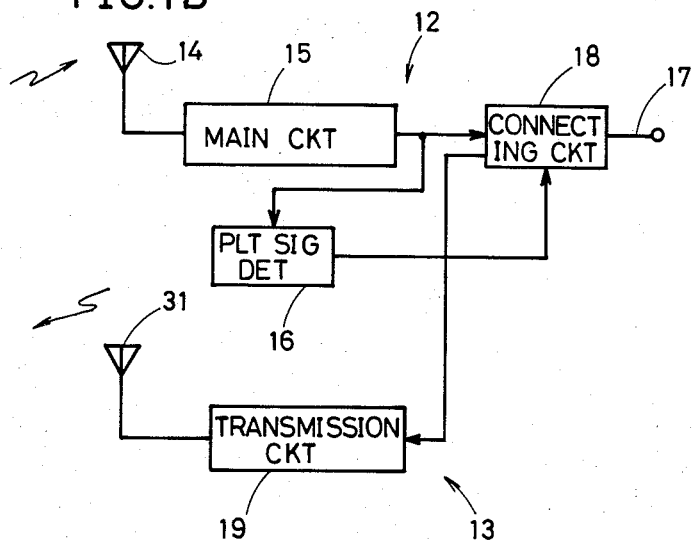

Referring to FIGS. 1A and 1B of the drawings, detailed description is now made with respect to the preferred embodiment of a system for preventing stealing of the line in radiotelephony according to the present invention.

FIG. 1A is a block diagram of a subsidiary telephone set of a radiotelephone. The subsidiary telephone set has a receiving portion 1 and a transmitting portion 2. The receiving portion 1 comprises an antenna 3, a main circuit 4 for frequency-conversion, detection, amplification and so on of signals received by the antenna 3 for outputting sound signals and a speaker 5 for receiving the sound signals from the main circuit 4. The transmitting portion 2 comprises a microphone 6, an amplification circuit 7 for amplifying sound signals from the microphone 6, a pilot signal oscillation circuit 9 for generating first and second pilot signals, a modulation circuit 8 for modulating carrier wave signals by the sound signals from the amplification circuit 7 and the pilot signals from the pilot signal oscillation circuit 9, an antenna 10 and an output circuit 11 for amplification etc. of the modulated signals modulated by the modulation circuit 8 for outputting the same from the antenna 10 as radio signals.

FIG. 1B shows a master telephone set which has, similarly to the subsidiary telephone set as shown in FIG. 1A, a receiving portion 12 and a transmitting portion 13. The receiving portion 12 comprises an antenna 14 for receiving the radio signals transmitted from the subsidiary telephone set, a main circuit 15 for detection, amplification, frequency-conversion and so on of the radio signals received by the antenna 14 for generating sound signals and pilot signals, a pilot signal detecting circuit 16 for receiving the signals from the main circuit 15 for detecting if the first and second pilot signals are successively received and a connecting circuit 18 responsive to the detection output from the pilot signal detecting circuit 16 for connecting the main circuit 15 to a telephone line 17. The transmitting portion 13 comprises an antenna 31 and a transmission circuit 19 for amplification, modulation, and frequency-conversion and so on of the sound signals fed from the telephone line 17 through the connecting circuit 18 for transmitting the same as radio signals from the antenna 31.

Operation of the system for preventing stealing of the line in radiotelephony embodying the present invention will now be described with reference to FIGS. 1A and 1B. When a telephone call is to be made by the subsidiary telephone set, a transmission switch (not shown) in the subsidiary telephone set is first turned on. Then, a first pilot signal having a first frequency is generated from the pilot signal oscillation circuit 9 followed by a second pilot signal having a second frequency. The first frequency may be selected from the audio frequency band, while the second frequency must not be within the range of the audio frequency band.

Figure 2:
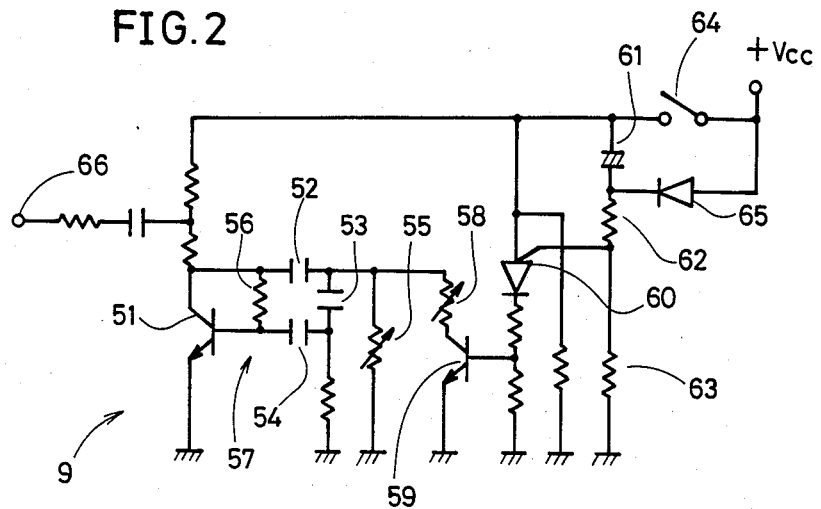
FIG. 2 is a circuit diagram showing an example of a frequency variable oscillator used in the system for preventing stealing of the line according to the present invention.

Referring now to FIG. 2, there is shown, as an example, a detailed circuit diagram of the pilot signal oscillation circuit 9. In FIG. 2, a feedback circuit 57 comprising capacitors 52, 53 and 54 and resistors 55 and 56 is connected between the collector and the base of a transistor 51. An additional resistor 58 is connected in parallel with the resistor 55 through a transistor 59. The base of the transistor 59 is connected to a thyristor 60 for controlling the transistor 59. The gate electrode of the thyristor 60 is connected to the junction between resistors 62 and 63 which are connected in series with each other between a capacitor 61 and the ground. One end of the capacitor 61 is connected to a power supply $+V_{CC}$ through a power supply switch 64, while the other end thereof is connected to the power supply $+V_{CC}$ through a diode 65.

In operation of the pilot signal oscillation circuit as shown in FIG. 2, when the power supply switch 64 is turned on, a signal generated at the collector of the transistor 51 is subjected to positive feedback to the base thereof through the feedback circuit 57. The positive feedback signal is amplified in the transistor 51, to produce a larger signal at the collector thereof. This signal is again subjected to positive feedback to the base of the transistor 51. Such operation is repeated for performance of oscillation.

In the meantime, when the power supply switch 64 is maintained to be off, the capacitor 61 is charged by the power supply voltage $+V_{CC}$ through the diode 65. Therefore, when the power supply switch 64 is turned on, a voltage of $+2V_{CC}$ is applied to both ends of the capacitor 61. Consequently, a reverse bias state takes place between the anode and the gate of the thyristor 60, which is then turned off. Since the thyristor 60 is in an off state, the transistor 59 is also in an off state and accordingly the additional resistor 58 is not incorporated into the feedback circuit 57. In such a state, the pilot signal osillation circuit oscillates at a first frequency $f_1$.

When the electric charge of the capacitor 61 is discharged through the resistors 62 and 63 with the lapse of time, a forward bias state takes place between the anode and the gate of the thyristor 60, which is thus turned on. In response to the turning-on of the thyristor 60, the transistor 59 is also turned on and accordingly the additional resistor 58 is incorporated into the feedback circuit 57. The circuit constant of the feedback circuit 57 is thereby changed, such that the pilot signal oscillation circuit oscillates at a second frequency $f_2$ which is different from the first frequency $f_1$.

The first pilot signal having the first frequency $f_1$ and the following second pilot signal having the second frequency $f_2$ oscillating in the above manner are extracted from an output terminal 66.

Returning to FIG. 1A, the first pilot signal generated in the pilot signal oscillation circuit 9 in the aforementioned manner is fed to the modulation circuit 8 for modulating a carrier wave signal. The modulated carrier wave signal is amplified in the output circuit 11, to be transmitted from the antenna 10 as a radio signal to the master telephone set. This radio signal is received in the master telephone set by the antenna 14. The radio signal thus received by the antenna 14 is subjected to frequency-conversion, detection, amplification and so on by the main circuit 15 to be converted into a first pilot signal, which in turn is fed to the connecting circuit 18. Since the connecting circuit 18 is not closed at this time, the first pilot signal is not transmitted to the telephone line 17.

The first pilot signal from the main circuit 15 is also fed to the pilot signal detecting circuit 16. As hereinafter described, the pilot signal detecting circuit 16 is brought in a standby state in response to reception of the first pilot signal. Following to the first pilot signal, the second pilot signal is transmitted from the subsidiary telephone set to the master telephone set in a similar manner to the first pilot signal, to be fed to the pilot signal detecting circuit 16. Upon receiving of the second pilot signal, the pilot signal detecting circuit 16, which is in the standby state in response to reception of the first pilot signal, supplies the connecting circuit 18 with an enabling signal for enabling the same. By virtue of this, the connecting circuit 18 is enabled, so that the master telephone set is connected to the telephone line 17. Such a closed state remains until the telephone communication is terminated whereby the second pilot signal disappears.

Figure 3:
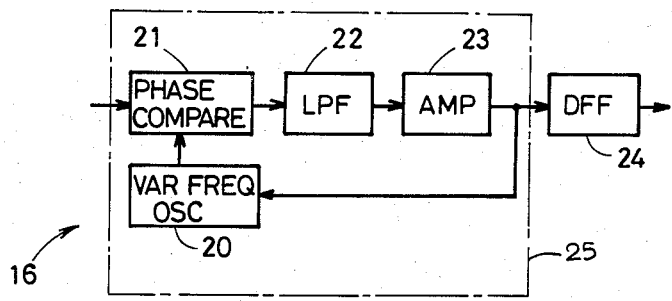
FIG. 3 is a block diagram showing an example of a pilot signal detecting circuit used in the system for preventing stealing of the line in radiotelephony according to the present invention.

Referring now to FIG. 3 of the drawings, there is shown in more detail a block diagram of the pilot signal detecting circuit 16. The pilot signal detecting circuit 16 comprises a pilot signal comparing portion 25 and a D-type flip-flop 24. The pilot signal comparing portion 25 includes a frequency variable oscillation circuit 20 which can oscillate at the first and second frequencies $f_1$ and $f_2$ which are identical to those of the first and second pilot signals, respectively. The frequency variable oscillation circuit 20 first oscillates at the first frequency $f_1$ and then, in response to reception of the first pilot signal, oscillates at the second frequency $f_2$. The first pilot signal from the main circuit 15 is fed to a phase comparator 21, to be compared with the first frequency $f_1$ from the frequency variable oscillation circuit 20. Upon coincidence of the frequencies, the phase comparator 21 generates an output signal. The coincidence output signal passes through a low-pass filter 22 to be fed to and amplified by an amplifier 23 and is thereafter supplied to the D-type flip-flop 24. By virtue of this, the D-type flip-flop 24 is brought in a standby state as hereinafter described.

In the meantime, the coincidence output signal from the phase comparator 21 is also fed to the frequency variable oscillation circuit 20, which in turn starts oscillation at the second frequency $f_2$ in response to reception of the coincidence output signal. Upon receiving the second pilot signal following the first pilot signal, the phase comparator 21 compares the frequency of the second pilot signal with the second frequency $f_2$ from the frequency variable oscillation circuit 20, to produce a coincidence output when the frequencies are in coincidence with each other. The coincidence output triggers the D-type flip-flop 24 which is in the standby state through the low-pass filter 22 and the amplifier 23. The D-type flip-flop 24 thus triggered supplies a detection signal indicating successive reception of the first and second pilot signals to the connecting circuit 18, thereby enabling the same.

Figure 4:
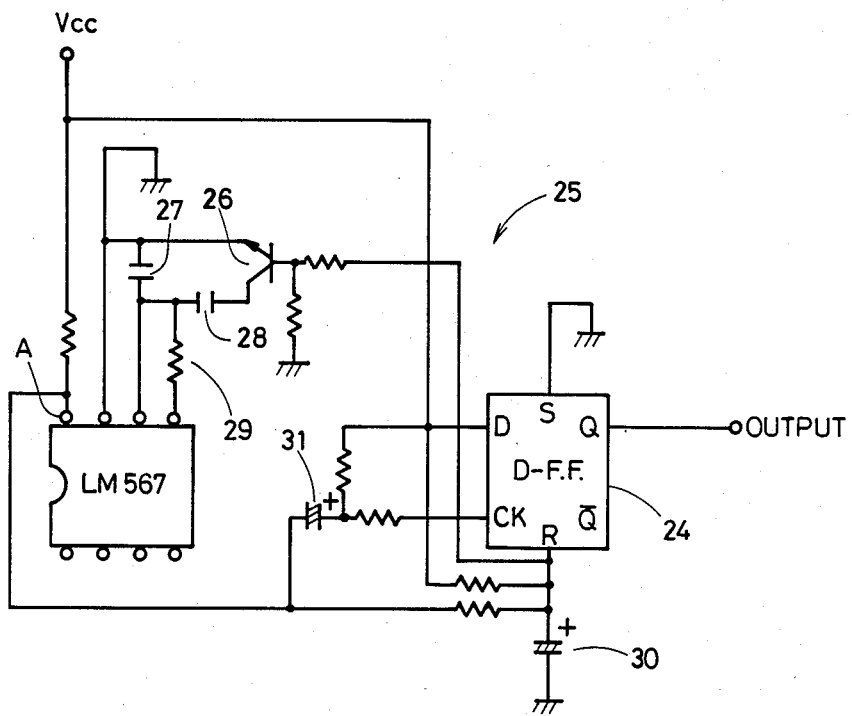
FIG. 4 is a circuit diagram showing in detail the pilot signal detecting circuit of FIG. 3.

FIG. 4 is a circuit diagram of a practical example of the pilot signal detecting circuit as shown in FIG. 3. In the practical example, an integrated circuit LC4013 manufactured by Tokyo Sanyo was employed as the D-type flip-flop 24. Further, an integrated circuit LM567 manufactured by Signetics was employed for forming the phase comparator 21, the low-pass filter 22, the amplifier 23 and the frequency variable oscillation circuit 20. Externally connected to the integrated circuit LM567 is a transistor 26, capacitors 27 and 28 and a resistor 29 forming a part of the frequency variable oscillation circuit 20.

The D-type flip-flop 24 is adjusted such that its output Q is inverted from the low level to the high level upon receiving a clock pulse in a clock terminal CK when its reset terminal R is at the low level. In the initial state, the reset terminal R is at the high level. Consequently, the transistor 26 is in an on state and the oscillation frequency of the frequency variable oscillation circuit 20 in the integrated circuit LM567 is identical to the first frequency $f_1$ determined by the capacitors 27 and 28 and the resistor 29. Upon receiving the first pilot signal, a terminal A of the integrated circuit is inverted from the high level to the low level and thus the reset terminal R of the D-type flip-flop 24 is inverted to the low level. By virtue of this, the D-type flip-flop 24 is brought in a standby state. When the terminal A of the integrated circuit is inverted from the high level to the low level, the clock terminal CK of the D-type flip-flop 24 is supplied with a clock pulse through a capacitor 31. However, since the reset terminal R remains at the high level at this time, the output Q of the D-type flip-flop 24 is not yet inverted.

When the reset terminal R of the D-type flip-flop 24 is inverted to the low level, the transistor 26 is turned off. Consequently, the frequency variable oscillation circuit 20 in the integrated circuit oscillates at the second frequency $f_2$ determined by the capacitor 27 and the resistor 29. In switching the signals from the first pilot signal to the second pilot signal, signal interruption temporarily takes place. As a result, the terminal A of the integrated circuit is temporarily inverted to the high level. However, the reset terminal R of the D-type flip-flop 24 is maintained at the low level by operation of the capacitor 30. When the second pilot signal is received, the terminal A of the integrated circuit is again inverted to the low level, whereby the clock terminal CK of the D-type flip-flop 24 is supplied with a clock pulse through the capacitor 31. Consequently, the output Q of the D-type flip-flop 24 is inverted from the low level to the high level. The high-level output Q enables the connecting circuit 18. Accordingly, the master telephone set is connected to the telephone line 17, thereby enabling telephone communication.

As hereinabove described, the second pilot signal is kept transmitted during the telephone communication. While the telephone communication is made, therefore, the pilot signal detecting circuit 16 as shown in FIG. 1B is supplied, in addition to the second pilot signal, with sound signals. However, no problem takes place at this time since the pilot signal detecting circuit 16 is in comparing operation with respect to the second pilot signal having a frequency out of the audio frequency band. Needless to say, the main circuit 15 may be provided therein with a circuit for exclusively extracting the pilot signals, e.g., a filter. In the aforementioned manner, the terminal A of the integrated circuit in FIG. 4 is maintained at the low level by the second pilot signal continuously transmitted during the telephone communication and thus the reset terminal R of the D-type flip-flop 24 is also maintained at the low level. Consequently, the output Q of the D-type flip-flop 24 continuously supplies the high-level signal to the connecting circuit 18 during the telephone communication, thereby maintaining connection between the master telephone set and the telephone line 17.

The telephone communication is made in the following manner: When the transmission switch (not shown) of the subsidiary telephone set as shown in FIG. 1A is turned on, the pilot signal oscillation circuit 9 successively transmits the first and second pilot signals through the antenna 10. As also hereinabove described, the first and second pilot signals are successively received by the master telephone set as shown in FIG. 1B and the connecting circuit 18 is closed by the aforementioned operation. Consequently, the master telephone set is connected to the telephone circuit 17, thereby enabling the telephone communication. When a dial signal generator (not shown) of the subsidiary telephone set is operated in this state to generate a dial signal corresponding to a telephone number of the other party, the dial signal modulates a carrier wave signal in the modulation circuit 8. The modulated carrier wave signal is transmitted to the master telephone set through the output circuit 11 and the antenna 10 in a similar manner to the pilot signals.

The dial signal from the subsidiary telephone set is demodulated in the main circuit 15 of the master telephone set shown in FIG. 1B, to be fed to the telephone line 17 through the connecting circuit 18 now closed, thereby to call the other party. When the other party recognizes a ring to take up a handset, telephone communication is enabled through the telephone line 17. When an operator of the subsidiary telephone set shown in FIG. 1A speaks through the microphone 6 in this state, the voice signal is amplified in the amplification circuit 7, to be transmitted to the master telephone set through the modulation circuit 8, the output circuit 11 and the antenna 10 similarly to the aforementioned pilot signals and the dial signal. Since the telephone sets are thus in communication, the pilot signal oscillation circuit 9 continuously transmits the second pilot signal.

The sound signal from the subsidiary telephone set is demodulated in the main circuit of the master telephone set, to be transmitted to the other party through the connecting circuit 18 now closed and the telephone line 17. The second pilot signal having the frequency out of the audio frequency band is continuously fed to the pilot signal detecting circuit 16, thereby maintaining the connecting circuit 18 closed. Since the second pilot signal has the frequency out of the audio frequency band, no problem is caused by transmission of the same to the other party through the telephone line 17. Further, as hereinabove described, since the pilot signal detecting circuit 16 is in the comparing operation with respect to the second pilot signal having the frequency out of the audio frequency band at this time, no problem is caused by feeding of the sound signal to the same. However, the main circuit 15 may be provided therein with a filter for extracting the pilot signals.

The sound signal from the other party is fed to the transmission circuit 19 of the master telephone set 10 through the telephone line 17 and the connecting circuit 18 which is now closed. The telephone circuit 17 and the receiving and transmitting portions of the master telephone set are coupled by a well-known hybrid coil. Further, a well-known relay switch, for example, may be employed as a mechanism for connecting and disconnecting the telephone line 17 and the receiving and transmitting portions of the master telephone set in response to the detection output of the pilot signal detecting circuit 16. The sound signal from the other party is subjected to amplification, modulation and so on in the transmission circuit 19, to be transmitted to the subsidiary telephone set through the antenna 31. The sound signal thus transmitted from the master telephone set is fed to the main circuit 1 of the subsidiary telephone set through the antenna 3 to be modulated therein to drive the speaker 5. The message from the other party is thus transmitted to the operator of the subsidiary telephone set. Such operation is repeated, thereby making the telephone communication.

The main circuit 1 of the subsidiary telephone set and the transmission circuit 19 of the master telephone set are well known to those skilled in the art and are not essential for the present invention. The amplification circuit 7, the modulation circuit 8 and the output circuit 11 of the subsidiary telephone set and the main circuit 15 of the master telephone set are also well known to those skilled in the art. In the practiced circuit, an integrated circuit MC3359P manufactured by Motorola was employed as a part of the main circuit 15. The connecting circuit 18 of the master telephone set may be formed by well-known hybrid coil and relay switch as hereinabove described.

Since first and second pilot signals are employed in the present invention, a combination of signals can be varied for effectively preventing stealing of the line. Further, since the first pilot signal may be transmitted according to the present invention, only when there is no sound signal to bring the master telephone set in a standby state, its frequency may be selected from the audio frequency band. Since the frequency of the first pilot signal can be consequently selected from a relatively wide frequency range, the combination of the first and second pilot signals may further be varied, leading to further effective prevention of stealing of the line.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system for preventing stealing of the line in radiotelephony having a master telephone set and a subsidiary telephone set making reception and transmission of radio signals therebetween, said master telephone set being connected to a telephone line in response to a pilot signal from said subsidiary telephone set, wherein said subsidiary telephone set comprises:

pilot signal generating means for generating a first pilot signal having a first frequency and a second pilot signal having a second frequency, said second pilot signal following said first pilot signal; and transmitting means for modulating a carrier wave signal by at least said first and second pilot signals and transmitting the modulated signal to said master telephone set; and said master telephone set comprises:

receiving means for receiving and demodulating at least said first and second pilot signals from said subsidiary telephone set;

pilot signal detecting means connected to said receiving means for detecting whether said first pilot signal and said second pilot signal are successively received; and connecting means coupled to said pilot signal detecting means for connecting said receiving means to said telephone line in response to detection by said pilot signal detecting means of said successive reception of said first pilot signal and said second pilot signal.

2. A system for preventing stealing of the line in radiotelephony in accordance with claim 1, wherein said pilot signal detecting means includes determination means for determining whether or not signals from said receiving means have said first frequency and said second frequency.

3. A system for preventing stealing of the line in radiotelephony in accordance with claim 2, wherein said determination means includes:

oscillation means for providing at least signals having said first frequency and said second frequency; and comparing means for phase-comparing said first and second pilot signals from said receiving means with signals from said oscillation means.

4. A system for preventing stealing of the line in radiotelephony in accordance with claim 3, wherein said oscillation means is adjusted to oscillate at said first frequency before said first pilot signal is received by said master telephone set and to oscillate at said second frequency after said first pilot signal is received by said master telephone set.

5. A system for preventing stealing of the line in radiotelephony in accordance with claim 2, wherein said pilot signal detecting means further includes connecting means enabling means for providing an enabling signal for enabling said connecting means when, following a first determination output from said determination means indicating that a signal from said receiving means has said first frequency, a second determination output from said determination means indicating that a signal from said receiving means has said second frequency is received.

6. A system for preventing stealing of the line in radiotelephony in accordance with claim 5, wherein said connecting means enabling means includes flip-flop means, said flip-flop means being adjusted to be reset-released in response to said first determination output and to provide said enabling signal to said connecting means in response to said second determination output.

7. A system for preventing stealing of the line in radiotelephony in accordance with claim 1, wherein
said pilot signal generating means includes an oscillation circuit having a positive feedback circuit,
said positive feedback circuit having first and second circuit constants; and
said pilot signal generating means further includes circuit constant changing means for automatically changing said circuit constants.

8. A system for preventing stealing of the line in radiotelephony in accordance with claim 7, wherein
said circuit constant changing means includes switching means and on/off changing means for automatically changing on/off states of said switching means, and
said positive feedback circuit includes an additional electric element,
said additional electric element being incorporated into said positive feedback circuit or removed therefrom in response to said on/off states of said switching means.

9. A system for preventing stealing of the line in radiotelephony in accordance with claim 8, wherein
said on/off changing means includes electric charge storing means,
said switching means being automatically switched between on/off states in response to discharging of said electric charge storing means.

10. A system for preventing stealing of the line in radiotelephony in accordance with claim 7, wherein
said oscillation circuit includes a transistor oscillation circuit having a transistor having a base and collector, between which said positive feedback circuit is connected.

11. A system for preventing stealing of the line in radiotelephony in accordance with claim 1, wherein
said connecting means includes a relay switch enabled in response to detection by said pilot signal detecting means of said successive reception of said first pilot signal and said second pilot signal for connecting said master telephone set to said telephone line.

12. A system for preventing stealing of the line in radiotelephony in accordance with claim 1, wherein
said transmitting means is adjusted to further modulate said carrier wave signal by a sound signal to be transmitted from said subsidiary telephone set to said master telephone set, and
said receiving means is adjusted to receive said sound signal for further demodulating the same.

13. A system for preventing stealing of the line in radiotelephony in accordance with claim 1, wherein
said second pilot signal is continuously transmitted during telephone communication between said master telephone set and said subsidiary telephone set, and said master telephone set is disconnected from said telephone line in response to absence of said second pilot signal.

14. A system for preventing stealing of the line in radiotelephony in accordance with claim 1, wherein
said first frequency is a frequency within an audio frequency band, and
said second frequency is a frequency out of the audio frequency band.

* * * * *